United States Patent [19]

Jackson et al.

[11] Patent Number: 4,506,896
[45] Date of Patent: Mar. 26, 1985

[54] CHUCKS

[75] Inventors: Joseph F. Jackson, Halifax; Ralph A. Waite, Bradford, both of England

[73] Assignee: Pratt Burnerd International Limited, Halifax, England

[21] Appl. No.: 449,568

[22] Filed: Dec. 14, 1982

[30] Foreign Application Priority Data

Jan. 5, 1982 [GB] United Kingdom ............... 8200145

[51] Int. Cl.³ .............................................. B23B 31/16
[52] U.S. Cl. ..................................... 279/118; 279/110; 279/119
[58] Field of Search ...................... 279/111, 118–120, 279/1 A, 123, 110, 121

[56] References Cited

U.S. PATENT DOCUMENTS

| 4,200,300 | 4/1980 | Röhm | 279/121 X |
| 4,240,645 | 12/1980 | Röhm | 279/121 X |
| 4,352,500 | 10/1982 | Blättry et al. | 279/193 X |

Primary Examiner—William R. Briggs
Assistant Examiner—Glenn L. Webb
Attorney, Agent, or Firm—LeBlanc, Nolan, Shur & Nies

[57] ABSTRACT

A chuck comprises a body (10) rotatable about an axis (11) and at least one jaw (12) movable in a radial direction to clamp a workpiece in the chuck. At least one operating lever (14) is mounted on the body (10) and the, or each, lever is operable to move a jaw (12) radially. The, or each, lever is also movable axially with respect to the chuck body (10), to disengage from the associated jaw (12), enabling the associated jaw (12) to be removed simply and quickly from the chuck body (10) by movement in the radial direction.

9 Claims, 4 Drawing Figures

CHUCKS

BACKGROUND OF THE INVENTION

The invention relates to chucks.

DESCRIPTION OF THE PRIOR ART

Our European patent application No. 81303746.2 relates to a form of chuck having a readily removable jaw or jaws designed to reduce production time lost during jaw changes, an important consideration with relatively costly numerically controlled machine tools.

In the form of chuck to which European patent application No. 81303746.2 relates, the or each jaw is first moved radially and is then withdrawn axially.

The axial movement enables the jaws to move clear of an operating mechanism such as the lever 22 shown in FIGS. 7 and 9 of European patent application No. 81303746.2.

OBJECT OF THE INVENTION

It is an object of the invention to provide for rapid change of the jaw or jaws of such a lever operated chuck without the need to complicate the construction of the jaw or jaws themselves by providing for the jaw or jaws to move axially.

SUMMARY OF THE INVENTION

Accordingly the invention provides a chuck comprising:

(a) a body rotatable about an axis;

(b) at least one jaw movable in a radial direction to clamp a workpiece in the chuck;

(c) an operating lever mounted on the body and operable to move the jaw radially, the operating lever also being movable axially with respect to the chuck body to disengage the operating lever from the jaw thus enabling the jaw to be removed from the chuck body by movement in the radial direction.

Preferably the lever co-operates with an eccentric device, rotation of the eccentric device causing axial movement of the lever.

The eccentric device may include a member which projects to a point adjacent an outer surface of the chuck, rotation of the member such as to move the lever out of its normal operating position causing a part of the member to project from the said surface of the chuck thus giving a visual indication that the lever is not in its normal operating position.

Alternatively or in addition there may be provided electrical means to signal if a lever is out of its normal operating position.

The electrical means may comprise an electrical proximity detector arranged to detect the condition of the eccentric device.

The chuck may be arranged so that the lever can only be moved axially to disengage the lever from a jaw when the chuck is in the fully open or fully closed position, thus reducing the likelihood that the lever will be moved out of its normal operating position when the chuck is gripping a workpiece.

The chuck may be such that a device obstructs the axially inner end of the lever, preventing it from moving axially inwardly, except when the chuck is in the fully open or fully closed position.

Other objects, preferred features and advantages of the invention will become apparent from the following description of one embodiment of the invention:

DESCRIPTION OF ONE EMBODIMENT OF THE INVENTION

The chuck shown in the figures comprises a body 10 rotatable about an axis 11, the body having three jaws movable in a radial direction to clamp a workpiece (not shown) in the chuck. The jaws and their operation are identical, and so only one jaw 12 is illustrated.

Figure 1:
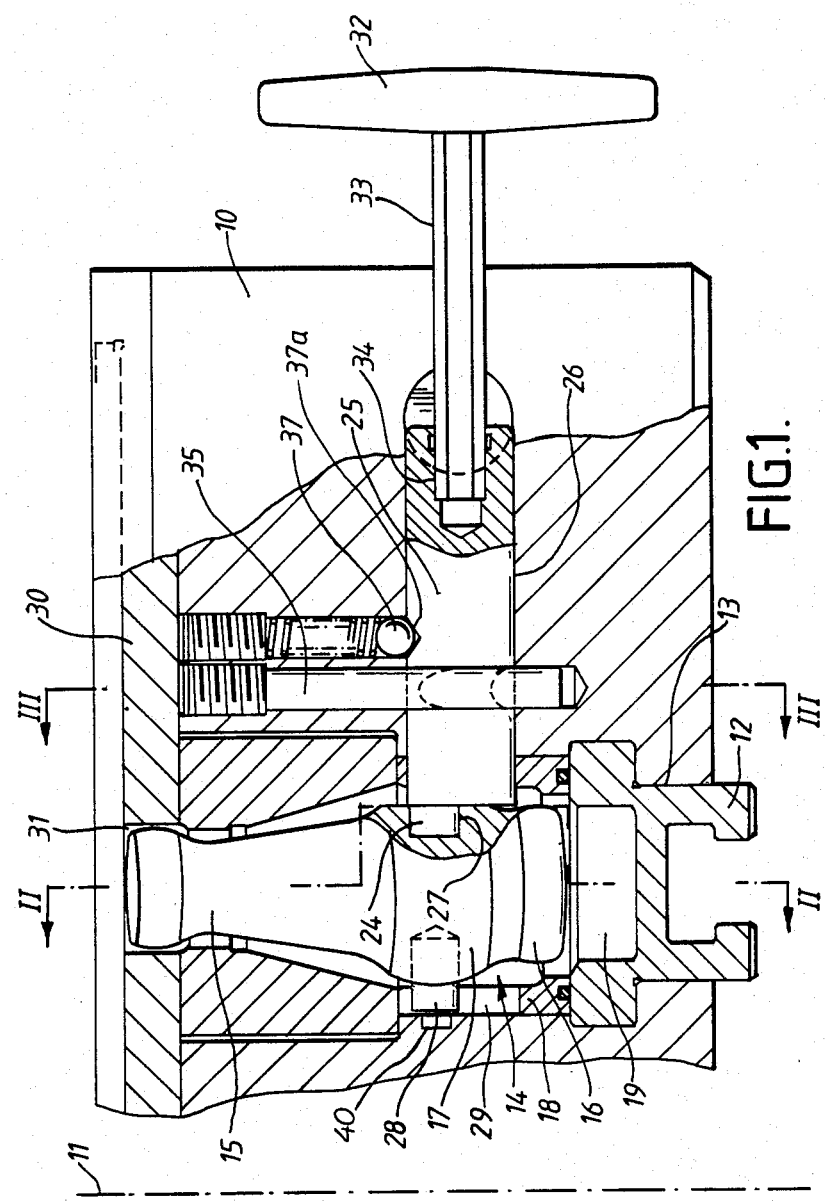
FIG. 1 is a cross-sectional view through part of an embodiment of chuck according to the invention, showing an operating lever and jaw of the chuck, the section being taken on line I—I of FIG. 4.

The jaw 12 comprises a base jaw which is generally T-shaped in cross-section, as best shown in FIG. 1. The jaw is slidable radially in a generally T-shaped slot 13 in the body 10, so that the jaw is movable in the radial directions illustrated in FIG. 2 by the arrows A. In use a top jaw (not shown) is mounted on each base jaw, and it is the top jaws that actually make contact with the workpiece.

The object of the invention is to enable the base jaws, together with any top jaws carried thereon, to be rapidly removable from the chuck, so that they can be rapidly replaced by a different type of jaw if the chuck is to be used to carry out a different type of operation or grip a significantly different size of workpiece.

Mounted within the chuck body, axially inwardly of the jaw 12, there is an operating lever 14. This lever has an inner end 15, an outer end 16, and a generally spherical intermediate portion 17. The intermediate portion 17 engages within a sleeve 18 such that the lever can make limited rocking movements, rolling within the sleeve 18 on the generally spherical intermediate portion 17.

When the chuck is in normal use, the outer end 16 of the lever 14 engages within a recess 19 in the jaw 12. Thus rocking movements of the lever control the radial inward and outward movement of the jaw.

It will be appreciated that there is a separate lever 14 for each of the jaws.

The way in which rocking movement is applied to each lever 14 is conventional and need not be described in detail. It is sufficient to say that a control member 20, which bears against the inner end 15 of the lever, can be moved radially inwardly and outwardly by means of an axially movable cylinder 21 which has a wedge face 22 co-operating with a wedge face 23 of the member 20.

Figure 2:
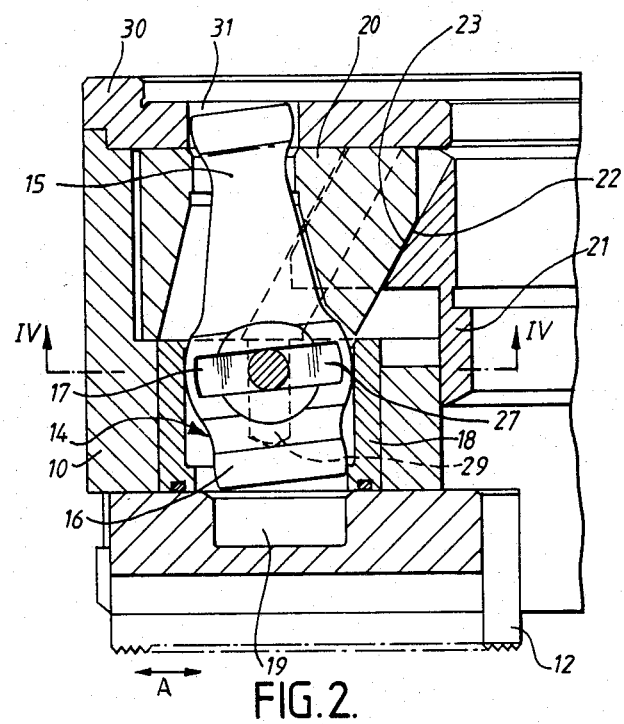
FIG. 2 is a cross-section taken on line II—II of FIG. 1.
Figure 3:
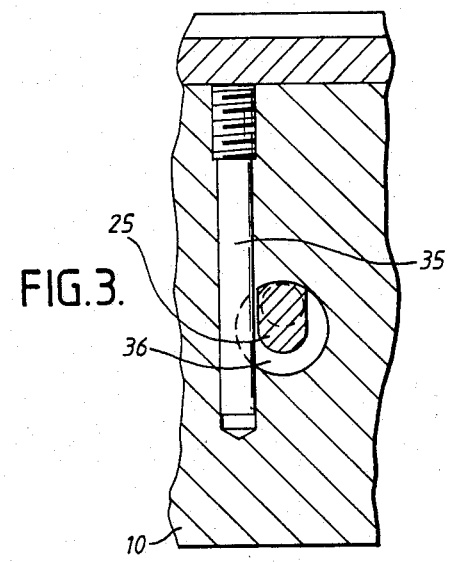
FIG. 3 is a cross-section taken on line III—III of FIG. 1.

In order to change the jaws 12, the levers 14 are moved axially inwardly to the position shown in FIGS. 1 and 2, in which the ends 16 of the levers are clear of the recesses 19 in the jaws.

Axial movement of each lever 14 is controlled by a pin 24 which projects eccentrically from a cylindrical member 25 arranged in the bore 26 in the chuck body 10. The pin 24 engages in a slot 27 provided in the intermediate portion 17 of the lever 14. Rotation of the cylindrical member 25 causes axial movement of the lever.

During axial movement of the lever, the side of the lever opposite to the pin 24 is guided by a peg 28 which is screwed into the lever, the projecting end of the peg engaging in a slot 29 which is formed in the collar 18.

A backplate 30 is provided which, as best seen in FIG. 2, obstructs the end 15 of the lever in this embodiment except when the chuck is in the fully closed condition. In this condition, a hole 31 in the backplate is in register with the end 15 of the lever, so that the lever can carry out the neccessary inward axial movement. If an attempt is made to move the lever radially inwardly when the chuck is in any other position, the end 15 of the lever will abut against the backplate 30 and the movement will be prevented. This is a safety feature intended to reduce the risk that the levers will be moved radially inwardly, thus completely freeing the jaws, when a workpiece is being gripped by the chuck.

When the jaws are to be changed, and the chuck is in the appropriate position, with the workpiece removed, a manual operating key 32 has its hexagonal cross-section shaft 33 applied to a mating driving hole 34 in the outer end of the cylindrical member 25. Rotation of the key 32 one half turn disengages the lever 14 and permits the corresponding jaw to be withdrawn and a replacement jaw inserted. Return of the cylindrical member 25 to its original position re-engages the operating lever.

The limiting positions of the cylindrical member 25 are defined by a pin 35 which engages in a groove 36 which extends around part of the periphery of the cylindrical member 25. In addition, a spring loaded ball 37 is provided engageable in each of two circumferentially spaced apart recesses 37a provided on the periphery of the cylindrical member 25. These cause the cylindrical member 25 to click into each of its two limiting positions, thus assisting the chuck operator to tell when the cylindrical member is correctly positioned.

Figure 4:
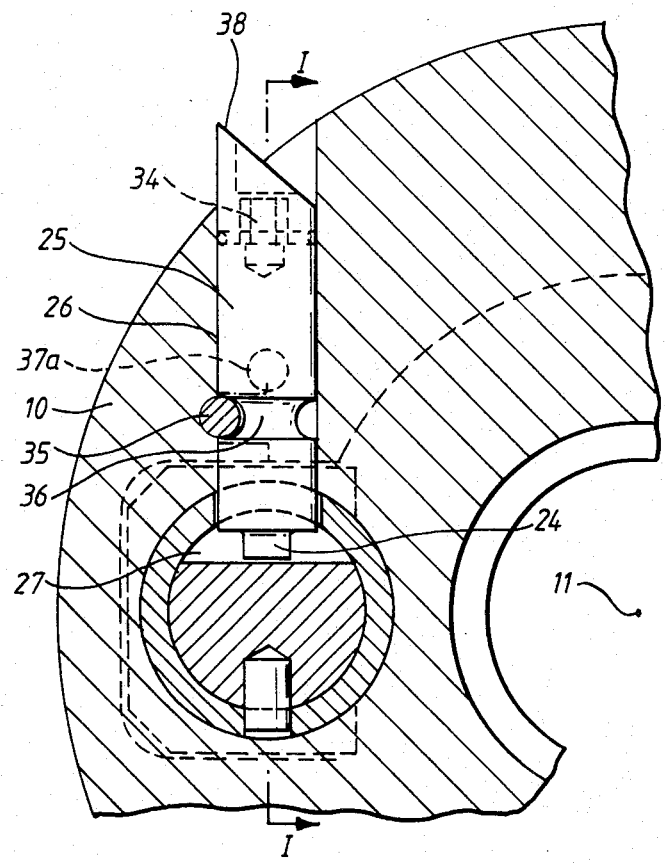
FIG. 4 is a section on line IV—IV of FIG. 2.

The outer end 38 of the cylindrical member 25 is angled to blend with the periphery of the chuck body when the associated lever is in its normal operating position. This then permits the end of the cylindrical member 25 to be used to give a clear visual indication of the position of the cylindrical member 25 and hence the associated lever. When the lever is in the disconnected position, as shown in the Figures, part of the end 38 of the cylindrical member 25 is proud of the periphery of the chuck by a significant amount, as shown in FIG. 4, and this can readily be seen by the operator of the chuck.

The invention is not restricted to the details of the foregoing embodiment. For example, an electrical proximity probe 40 may be positioned to detect the condition of the eccentric pin 24 and provide an electrical signal should any of the eccentric pins be in the position which indicates disengagement of the associated lever. When the chuck is in use on a machine tool, this electrical signal can be provided during the first few revolutions of the machine tool spindle and be used to stop the spindle rotation prior to acceleration to a speed which would be dangerous with a disconnected jaw.

There is a further safety factor inherent in the embodiment described above, in that normal operation of the chuck is prohibited when any of the levers are in the disengaged position, since the associated jaw will not move when an attempt is made to open or close the jaws.

We claim:
1. A chuck comprising:
 (a) a body rotatable about an axis;
 (b) at least one jaw movable in a radial direction to clamp a workpiece in the chuck;
 (c) an operating lever mounted about a pivot on the body and operable to move the jaw radially, and means for moving the operating lever and pivot axially with respect to the chuck body to disengage the operating lever from the jaw thus enabling the jaw to be removed from the chuck body by movement in the radial direction.

2. A chuck as claimed in claim 1, in which the lever co-operates with an eccentric device, rotation of the eccentric device causing axial movement of the lever.

3. A chuck as claimed in claim 2, in which the eccentric device includes a member which projects to a point adjacent an outer surface of the chuck, rotation of the member such as to move the lever out of its normal operating position causing a part of the member to project from the said surface of the chuck thus giving a visual indication that the lever is not in its normal operating position.

4. A chuck as claimed in claim 2, in which electrical means are provided to signal if a lever is out of its normal operating position.

5. A chuck as claimed in claim 4, in which the electrical means comprise an electrical proximity detector arranged to detect the condition of the eccentric device.

6. A chuck as claimed in claim 1, in which the lever can only be moved axially to disengage the lever from a jaw when the chuck is in the fully open or fully closed position.

7. A chuck as claimed in claim 1, in which a device obstructs the axially inner end of the lever, preventing it from moving axially inwardly, except when the chuck is in the fully open or fully closed position.

8. A chuck as claimed in claim 1, in which there is a plurality of similar jaws.

9. A machine tool fitted with a chuck as claimed in claim 1.

* * * * *